United States Patent [19]

Rilly et al.

[11] Patent Number: 4,847,746
[45] Date of Patent: Jul. 11, 1989

[54] INVERTER TO FEED A LOAD HAVING AN INDUCTIVE COMPONENT

[75] Inventors: Gerard Rilly, Unterkirnach; Laurent Jeanneteau, Pfaffenweiler, both of Fed. Rep. of Germany

[73] Assignee: Deutsche Thomson-Brandt GmbH, Villingen-Schwenningen, Fed. Rep. of Germany

[21] Appl. No.: 171,178

[22] Filed: Mar. 21, 1988

[30] Foreign Application Priority Data

Mar. 20, 1987 [DE] Fed. Rep. of Germany ....... 3709250
Jul. 21, 1987 [DE] Fed. Rep. of Germany ....... 3724043

[51] Int. Cl.$^4$ .......................................... H02M 7/538
[52] U.S. Cl. ..................................... 363/132; 363/49; 363/56; 363/98
[58] Field of Search ........................ 363/16, 17, 22, 23, 363/49, 56, 98, 132, 133, 134; 323/289, 901

[56] References Cited

U.S. PATENT DOCUMENTS

| 4,041,367 | 8/1977 | Gold et al. | 363/97 |
| 4,047,089 | 9/1977 | Susuki et al. | 363/17 |
| 4,301,498 | 11/1981 | Farrer | 363/17 |
| 4,319,316 | 3/1982 | Farrer et al. | 363/132 |
| 4,390,769 | 6/1983 | Steigerwald | 219/10.77 |
| 4,614,998 | 9/1986 | Rilly | 363/131 |
| 4,688,164 | 8/1987 | Rilly | 363/132 |

FOREIGN PATENT DOCUMENTS

| 3400671 | 10/1985 | Fed. Rep. of Germany . |
| 3601958 | 7/1986 | Fed. Rep. of Germany . |
| 3508289 | 9/1988 | Fed. Rep. of Germany . |
| 1361646 | 7/1974 | United Kingdom . |
| 2034541 | 6/1980 | United Kingdom . |

Primary Examiner—Peter S. Wong
Attorney, Agent, or Firm—Spencer & Frank

[57] ABSTRACT

An inverter circuit for driving a load including an inductive component such as an inductive cooking appliance, and being powered by a pulsating DC source obtained by rectifying a single phase AC power input. The inverter includes a pair of power transistors operating in a push pull mode with a multiple winding transformer, and operating at a frequency in excess of the AC power line frequency. Alternate switching of the power transistors is fed back through the transformer to control the switching of the transistors. The improved circuit provides positive switching of the power transistors at the higher frequencies regardless of the fluctuations in amplitude of pulsating DC power input, by triggering the generation of constant firing pulses from a fixed voltage source to the transformer windings in a feedback arrangement. A starting oscillator is also provided to initially start, or restart, the inverter; and the starting oscillator is automatically decoupled from the inverter when the inverter is operating. In an alternative embodiment, the starting oscillator also provides the function of positively switching the power transistors after the inverter is functioning by changing its mode of operation from an oscillating circuit to a pulsing circuit.

12 Claims, 4 Drawing Sheets

INVERTER TO FEED A LOAD HAVING AN INDUCTIVE COMPONENT

BACKGROUND OF THE INVENTION

The present invention relates to an inverter which produces an output alternating voltage from a pulsating direct voltage for a load having an inductive component, particularly for the coil of an inductive cooking appliance. The frequency of the generated alternating voltage has an order of magnitude in the range of 10 to 100 kHz, particularly at about 30 kHz.

The output alternating voltage can be used to operate, for example, alternating current motors without commutation, inductors, transformers, fluorescent bulbs, at a higher frequency of about 30 kHz, and heating plates operating with inductive heating in which a magnetic field heats the container holding the food.

In the prior art, an inverter is known (see German Patent No. 3,400,671 or U.S. Pat. No. 4,614,998) in which a direct voltage is applied to a so-called half bridge including two series-connected power transistors. The transistors are alternatingly controlled to be conductive and generate the alternating voltage for the load at their point of connection. Between the successive conductive phases of the two transistors a rest period is provided as a safety measure in which both transistors are non-conductive. To permit the necessary current flow during these rest periods from the inductor load, free-running diodes polarized opposite to the collector-emitter paths of the transistors are connected in parallel with the transistors to temporarily take over the current from the load during the rest periods. A capacitor is connected in parallel with each diode to limit the steepness of the generated alternating voltage.

In such a prior art circuit it is also known to connect the connection point between the diodes, which are connected in parallel with the collector-emitter paths of the transistors, with the load, one the one hand, and, via a third winding, with the connecting point of the transistors, on the other hand. The currents from the two transistors flow alternatingly through this third winding. Pursuant to the principle of a current transformer, currents are thus generated in two secondary windings of the transformer and these currents reach the two transistors as base control currents. The windings are here polarized in such a manner that the voltages induced therein control the base of one transistor to be transmitting and the other to be blocked. The current flowing through the transistors is thus utilized to generate base currents of the desired polarity and amplitude for the control of the two transistors.

If the operating voltage applied to the series-connected transistors is derived from a three-phase network, e.g. a so-called three-phase current network with a 380 V between the phases, it is possible to realize a sufficiently high and uniform operating voltage and a good performance for the entire circuit.

If, however, the operating voltage is generated from a 220 V single-phase network, unstable operation may result and, in particular, faulty base actuation of the two transistors. The reason for this is that, on the one hand, the power supply voltage is then less than it would be in a three-phase network and, on the other hand, the pulsating direct voltage of 100 Hz derived from the power supply periodically drops to almost zero due to less than ideal filtering. The circuit may then become unstable at higher operating frequencies than the resonant frequency which is given by the frequency determining members, particularly the capacitors, the inductance of a heating coil and the inductance of the transformer. Operating at frequencies higher than the resonant frequency is necessary, however, to be able to choke the power. In the prior art inverter, this power control is effected by changing the operating frequency.

Although it is possible to convert, by means of large filtering members, the pulsating direct voltage obtained from the power supply into an approximately uniform direct voltage having sufficiently low ripple, i.e. a voltage having an amplitude which does not drop to a noticeable degree, the cost of such filtering members is uneconomical, particularly if the amount of power to be processed is high.

SUMMARY OF THE INVENTION

It is an object of the present invention to improve, in an inverter of the above-described type, the actuation of the bases of the two power transistors.

Thus, the solution according to the invention initially derives a setting value from one winding of the current transformer. This setting value controls a constant low voltage active current source. This current source feeds a current pulse to a winding of the transformer and this pulse travels, by way of current transformation in the transformer, to the bases of the transistors thereby providing proper switching of the transistors. The driver circuit for the transistors is thus supported by additionally feeding current into the transformer by means of a constant low voltage active current source.

The circuit according to the invention provides for proper actuation of the bases of the power transistors in that the transistors are quickly and fully switched through in the desired manner during their conductive phase. One advantage of the circuit according to the invention is that it operates independently of the amplitude of the operating voltage applied to the series connection of the transistors and also independently of the respective operating frequency of the inverter. An explanation for this is that the active current source is fed by a constant operating voltage and thus the current pulses fed to the transformer to support the driver circuit are not dependent in their amplitude and their position in time on the operating voltage across the power transistors and on the operating frequency. The circuit according to the invention provides for stable operation of the inverter over a wide range of power to be processed by the inverter, i.e. from about 300 W to 3 kW.

According to one feature of the invention, the circuit has an associated starting oscillator which ensures proper start-up of the circuit when it is switched on. The starting oscillator, when it is in the fully operational, stationary state, is switched off in each case by a setting value derived from the alternating voltage across the transformer.

DESCRIPTION OF THE PREFERRED EMBODIMENTS

Figure 1:
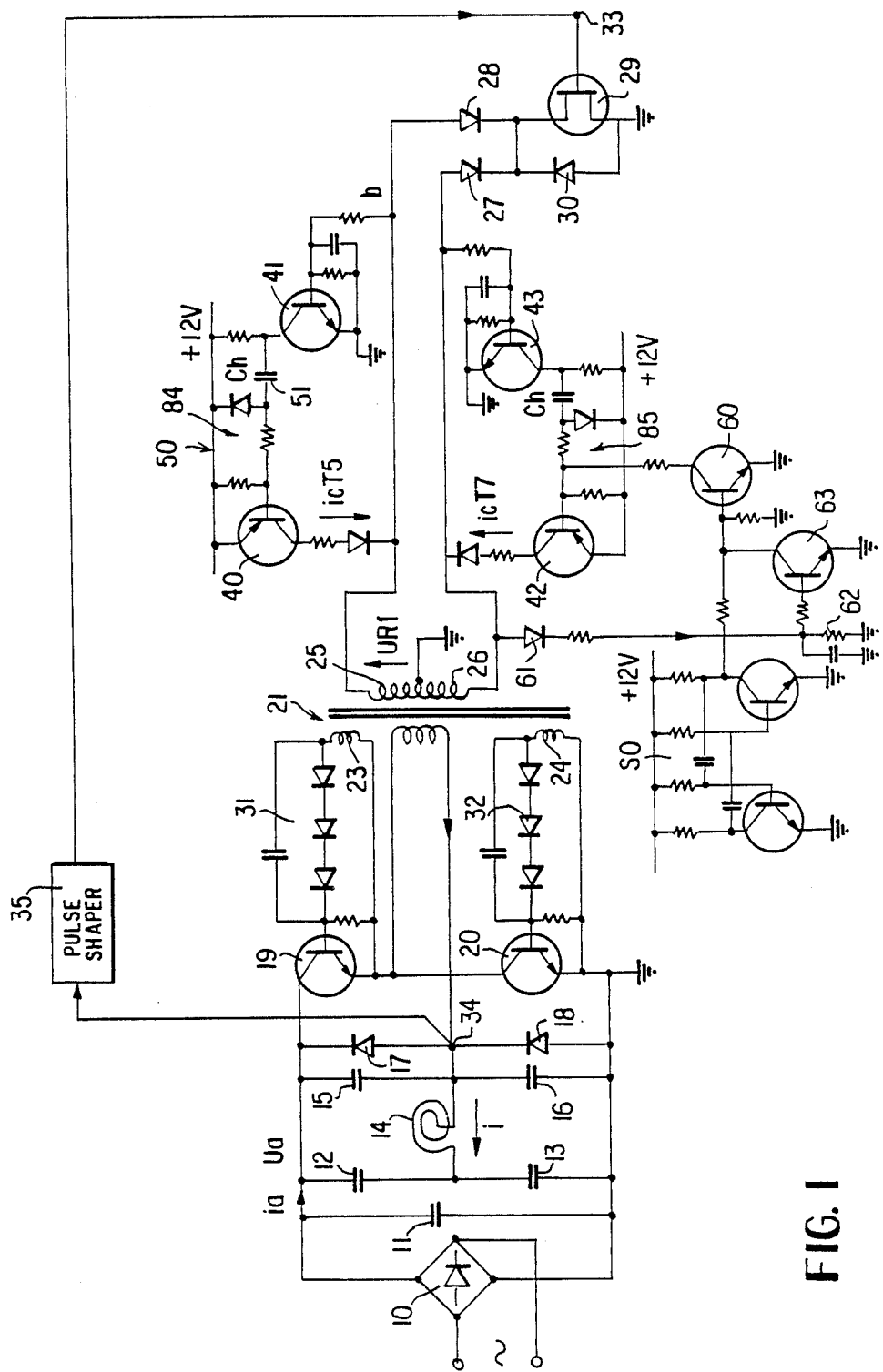
FIG. 1 shows the improved inverter circuit according to the invention.

Referring to the drawings, FIG. 1 shows an inverter circuit having a full wave rectifier 10, a filter capacitor 11, voltage divider capacitors 12 and 13, load coil 14 for an inductive cooking appliance, capacitors 15 and 16 to limit voltage peaks and take-over current, free running diodes 17 and 18, power transistors 19 and 20, transformer 21 having a primary winding 22 through which flows the current of transistors 19 and 20, windings 23 and 24 which actuate the bases of power transistors 19 and 20, and two secondary windings 25 and 26. The ends of windings 25 and 26 are connected via diodes 27 and 28 with a field effect transistor 29 which acts as an electronic switch. A Zener diode 30 is connected in parallel with the switching path of transistor 29.

Rectifier circuits 31 and 32, by rectifying the alternating voltage across windings 23 and 24, generate negative biases across transistors 19 and 20 thereby blocking conduction therethrough. These biases serve to improve the blockage and the cleanout of power transistors 19 and 20. The circuit is controlled by the voltage at 33 leading to the gate of field effect transistor 29. This voltage can be obtained at point 34 by means of a pulse shaper 35 leading from the alternating output voltage of the inverter at point 34. Then the circuit is configured to be self-oscillating. Alternatively, the voltage at 33 may come from a separate generator. In either case, the current flowing alternatingly through transistors 19 and 20 flows as a current iP through primary winding 22. This causes currents to be induced in windings 25 and 26 and these currents, by feedback, alternatingly control transistors 19 and 20 to be conductive or blocked. The inverter circuit described therefor is known and disclosed in detail in German Patents Nos. 3,400,671 and 3,508,289 [U.S. Pat. Nos. 4,614,998 and 4,688,164, respectively].

Figure 2:
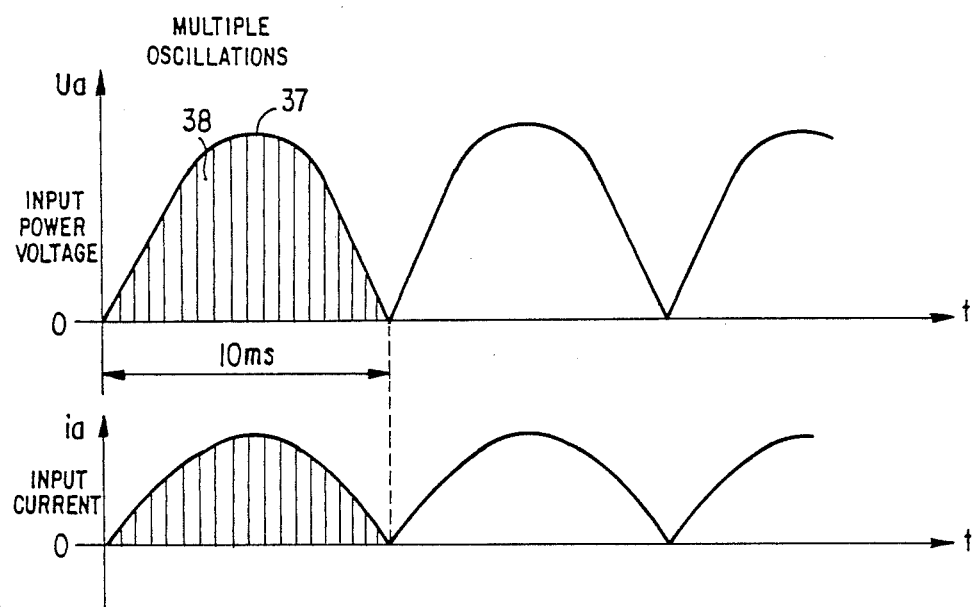
FIG. 2 shows the curve of the pulsating direct current power voltage applied to the inverter of FIG. 1 from a single phase AC source.

FIG. 2 shows a curve 37 of the pulsating DC voltage which constitutes the direct power voltage for the series connection of transistors 19 and 20, as well as the current ia of FIG. 1. It can be seen that voltage 37 having a power input frequency of 100 Hz is not a pure direct voltage, but a full-wave rectified pulsating direct voltage which periodically drops to zero. As already explained, this drop in amplitude interferes with the stable operation of the inverter. The hatching 38 in FIG. 2 indicates that a multitude of switchings occur between transistors 19 and 20 during each period of the DC power voltage duration of 10 ms, since the operating frequency of the inverter at about 30 kHz is significantly higher than the power supply frequency of 100 Hz.

Figure 3:
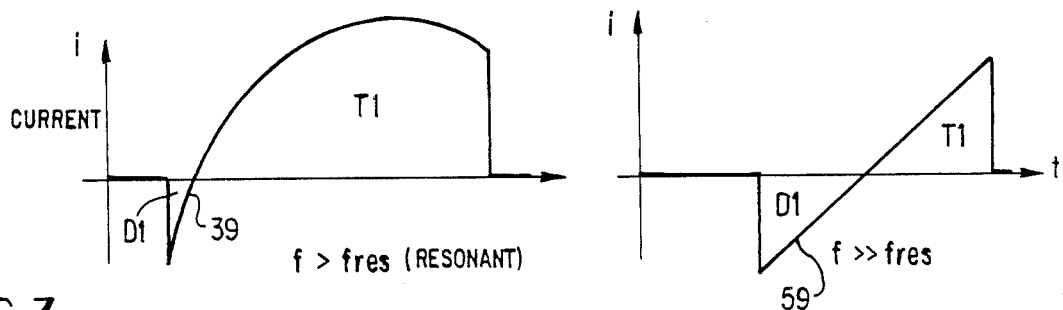
FIG. 3 shows the current wave shapes for various operating frequencies.

FIG. 3 shows a curve 39 of current passing through diode 17 and transistor 19. The left curve 39 of FIG. 3 shows this current curve for a frequency of which lies slightly above the resonant frequency of the circuit of FIG. 1. This current distribution is a further reason for the unstable operation of the inverter. The right curve of FIG. 3 shows a current curve 59 of current passing through diode 17 and transistor 19 as it appears in one of the two transistors 19 when the other transistor 20 is switched off. Diode 17 initially becomes conductive and takes over a current which drops to zero, changes its direction and is then taken over by the current through winding 22 and transistor 19 until transistor 19 is switched off. This described procedure is alternately repeated for transistor 20 in the other branch.

Since the current rise in transistor 19 also causes, by way of the coupling of coils 23 and 22 of transformer 21, actuation of the base of the transistor 19, a slight rise in the current through transistor 19 and in winding coil 22 also results only in a slight actuation of the base electrode of transistors 19 and 20. Under certain conditions, this current rise is not sufficient for the desired quick switching of the respective one of these transistors, and it may interrupt the generation of oscillations. Moreover, improper switching of the transistors 19 and 20 results in greater power losses at the transistor and the danger of their destruction.

To overcome such faulty base actuation of transistors 19 and 20, an additional circuit including transistors 40 and 41 is connected to winding 25 and, correspondingly, a similar circuit including transistors 42 and 43 is connected to winding 26.

Figure 4:
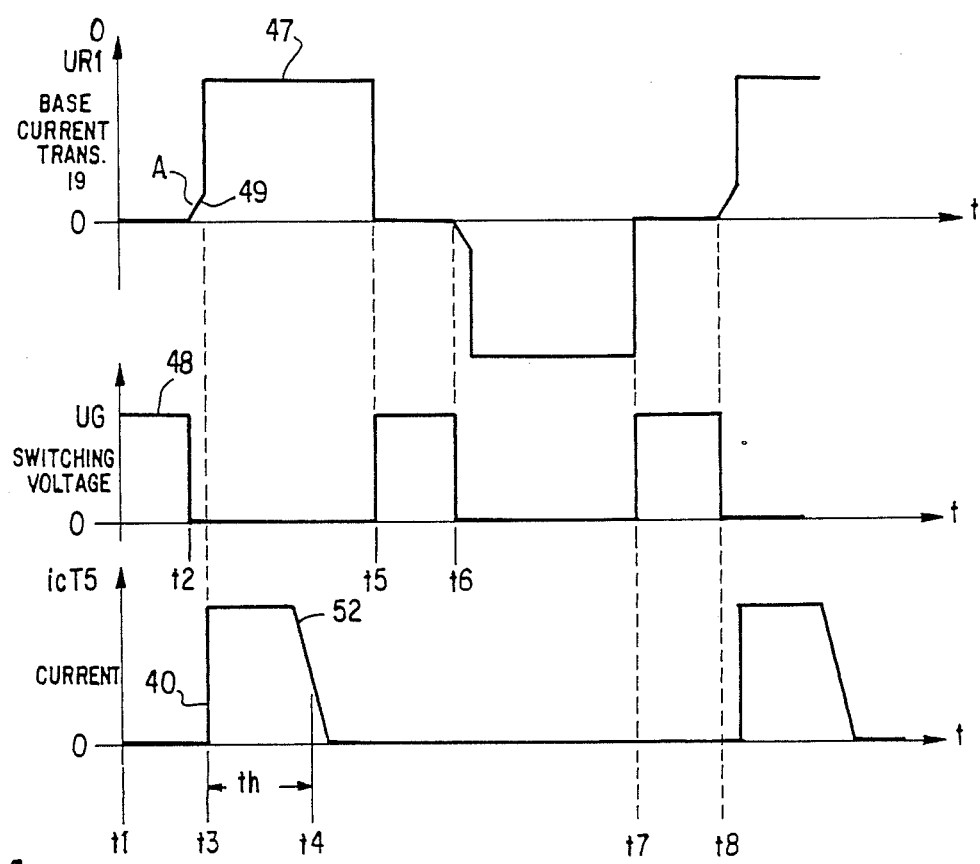
FIGS. 4 and 5 are curves explaining the circuit shown in FIG. 1.

The operation of this circuit will now be described with reference to FIG. 4, namely for upper transistors 40, 41. Curve 47 of FIG. 4 shows the voltage across feedback winding 25, and curve 48 shows the control voltage across the gate of transistor 29. At time t1, transistor 29 is fully conductive due to the voltage shown by curve 48, Winding 25 is accordingly short-circuited and all voltages and currents at transformer 21 are practically zero. The feedback from winding 22 to the other windings is, therefore, interrupted during this time. Once transistor 29 is disengaged at time t2 (FIG. 4), the feedback path is free again. However, the base current of transistor 19 initially rises only slowly as shown by the first part 49 of the ascending edge of voltage curve 47. Initially, this rise is undesirably slow. However, the rising edge 49 of voltage 47 is sufficient to trigger transistor 41 into conduction so that a negatively oriented pulse appears at its collector. This negative pulse travels via pulse shaper circuit 50 and capacitor 51 to the base of transistor 40 so that the latter is driven into conduction.

From time t3 to time t4 in FIG. 4, transistor 40 generates a current pulse 52 of a duration from t3 to t4. This current flow is fed back through winding 25 s that the rising edge of voltage 47, after the slow rise 49, exhibits the same fast rise as the ascending edge 40 of current 52. In this way, the initially weakly induced pulse from winding 25, is fed back as a strong pulse which is transmitted to winding 25 and by induction in feedback to winding 23. This actuate the base of transistor 19 so that this transistor is positively controlled to be conductive in the desired manner.

The duration of current pulse 52 (FIG. 4) is longer than the duration 39 shown in FIG. 3 during which diode 17 is conductive, since this time is controlled by pulse 52. The base actuation of transistor 19 is thus determined by the current pulse 52 which is artificially fedback by transistor 40, as described. Thus transistor 19 is positively controlled to be properly conductive during each cycle, even at low values for input power voltage 37 (FIG. 1), and is so controlled at all operating frequencies of the illustrated inverter. The feedback circuit including transistors 42 and 43, and transformer winding 26 operates in the same manner but in push-pull operation.

The period duration of the operating mode of the inverter from t1 to t7 (FIG. 4) lies between 30 μs and 50 μs, depending on the operating frequency. Transistor 29 is conductive from t1 to t2, from t5 to t6 and from t7 to t8, as shown by curve 48, and short-circuits windings 25 and 26 and thus the entire transformer 21. The duration of the current pulses through transistors 40 and 42 is about 15 μs. After the current pulse, i.e. beginning at t4, the current through transistor 19 flowing through winding 22 generates, via the feedback to winding 23, the base current driving transistor 19 which is necessary to switch it. Then, at time t5, transistor 29, again becomes conductive and the feedback is interrupted until, at time t6, the process begins anew. The energy still present in transformer 21 has the result that, in spite of the primary winding 22 being blocked, a small current still flows in the respective secondary winding 23 or 24, to generate a voltage in windings 25 and 26 required for detection by transistors 41 and 43.

Figure 5:
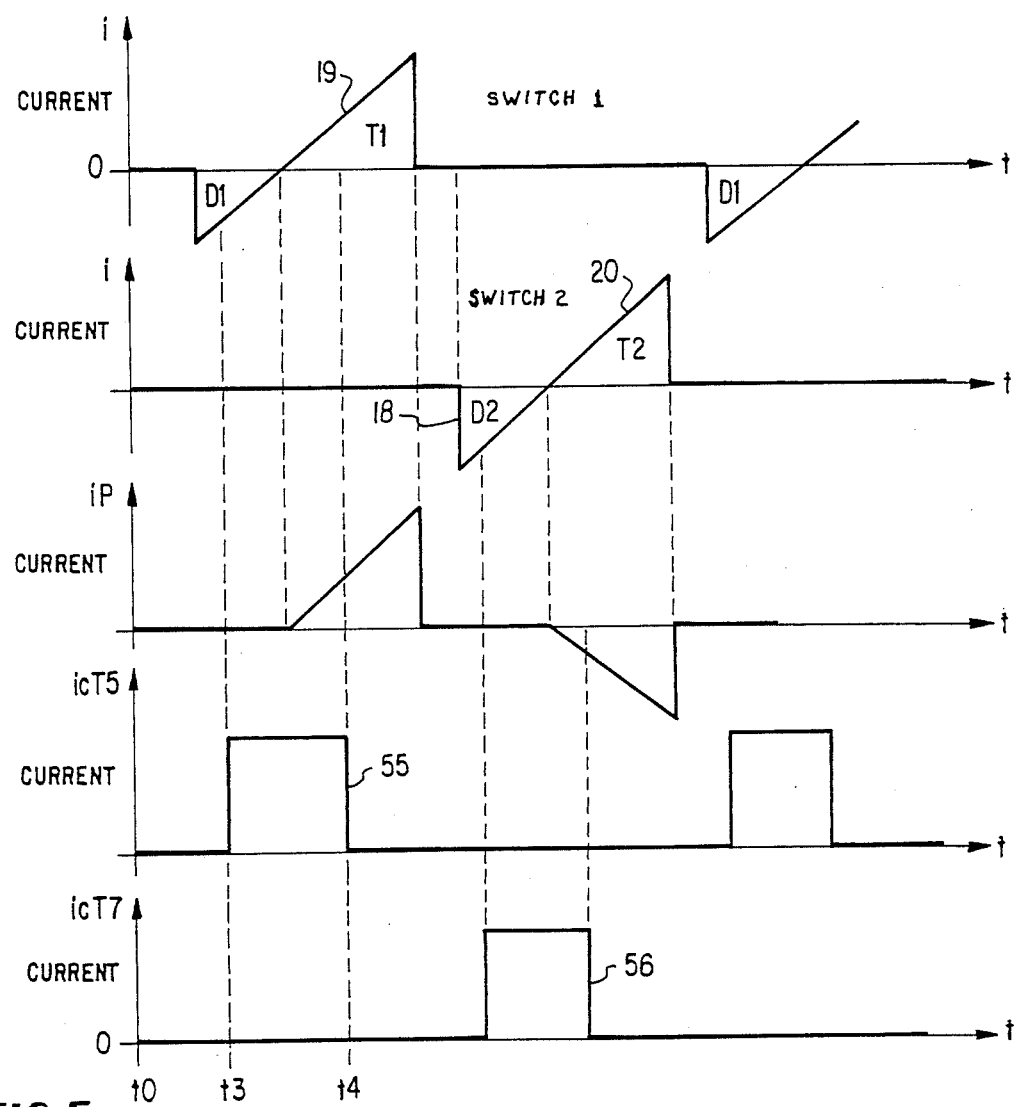

FIG. 5 shows the relationships between the currents in switch 1, formed by diode 17 and transistor 19, and in switch 2, formed by diode 18 and transistor 20. FIG. 5 shows, by the current curves, the components through which current i flows into load coil 14. Between transistor 19 and diode 18 and between transistor 20 and diode 17 the current briefly flows through capacitors 15 and 16 so that a continuous current i flows in load coil 14. The zero passage of this current i lies at the point where the current passes from diode 17 to transistor 19 and from diode 18 to transistor 20. Current iP is the current through primary winding 22 which corresponds either to the current through transistor 19 or to the current through transistor 20. In the lower portion of FIG. 5, the feedback current pulses 55 corresponding to pulses 52 in FIG. 4, are shown again and as well as the current pulses 56 produced by conduction of transistor 42.

Once the entire circuit is switched on, it may happen that the circuit does not begin to oscillate properly by itself. Therefore, an oscillator having a frequency of 50 kHz, as shown in FIG. 1, is additionally provided. The output voltage of the oscillator travels via a transistor 60 to the base of transistor 42 and from there to winding 26. The frequency of this oscillator is higher than the resonant frequency of the circuit and causes pulse transmission from winding 26 to winding 24 and thus to transistor 20. This causes the diodes of rectifier circuits 31 and 32 at the bases of transistors 19 and 20 to be charged. A voltage is generated across windings 23 and 24 which initially corresponds to the envelope of the pulse voltage across the transformer 21. Beginning with a certain amplitude of this voltage, a state is reached in which one of transistors 19 or 20 becomes conductive and the entire circuit begins to oscillate. Diode 61 obtains a positive voltage therefrom at filter member 62 to control transistor 63 to be conductive thereby grounding point d and blocking transistor 60. This interrupts the supply of voltage from the starting oscillator to the circuit. The circuit is then in a stationary state in which the starting oscillator is no longer required. The circuit is thus configured to be self-oscillating since the output at 34 of the circuit is connected via the pulse shaper 35 to the gate of transistor 29 and furnishes the feedback voltage at 33 required to generate oscillations.

In FIG. 1 feedback sensing transistors 41 and 43 are controlled by the current transformer 21, and feedback current is fed via transistors 40 and 42 back into transformer 21 by means of the same winding 25 or 26, respectively. However, instead of using the same windings 25 and 26, separate windings (not shown) may also be provided for these two functions. Each one of windings 25 and 26 would then be composed of two separate windings (not shown) of which the first pair of windings drives transistors 41 and 43 to be controlled, and the other pair of windings are fed with currents from transistors 40 and 42.

The circuit shown in FIG. 1 that is connected to windings 25 and 26, except for transistors 40, 42, (i.e. the circuit including the components 60, 63, 41, 43, 29 and the associated passive components) are all preferably configured as an integrated circuit. Also, this circuit together with the remaining control circuit for transistors 19 and 20 is preferably configured as an integrated circuit. This control circuit is the circuit (not shown in FIG. 1) between the output 34 of the inverter and the control electrode of transistor 29, which makes the inverter self-oscillating. Such a control circuit with additional measures for protecting the inverter against overloads is disclosed in greater detail in German Patent Nos. 3,400,671 and 3,508,289, corresponding to U.S. Pat. Nos. 4,614,998 and 4,688,164, respectively.

Figure 6:
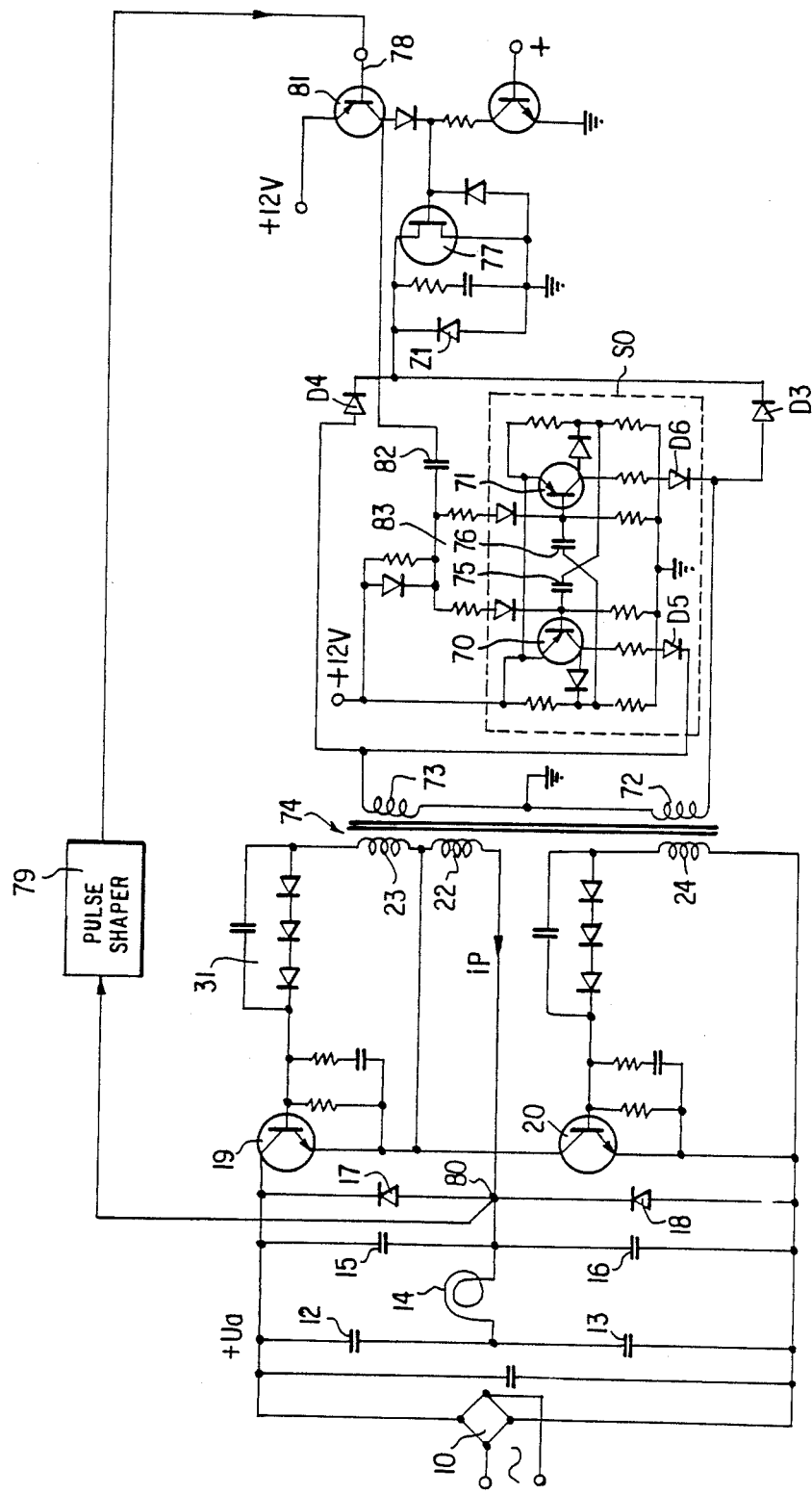
FIG. 6 shows a modification of the circuit of FIG. 1.

In the alternative circuit of FIG. 6, two transistors 70 and 71, each forming an active current source, may additionally take over the function of the starting oscillator which in FIG. 1 was formed by separate transistors and the corresponding components. Two reasons, in particular, are decisive for this. Transistors 70 and 71 serving as both current source and starting oscillator are effective at approximately the same location in the circuit, namely at primary winding 72, 73 of transformer 74. Additionally it is decisive that the transistors 70 and 71 which cause current to be fed in, on the one hand, and starting the oscillator on the other hand, do not become active simultaneously but successively in time. Immediately after the circuit is turned on, there is initially no actuation of transformer 74 so that the transistors 70 and 71 are not yet controlled to feed current. During this time, the starting oscillator is needed to cause the inverter circuit to oscillate. Accordingly, these same transistors 70, 71 are utilized in an advantageous manner to form the starting oscillator to feed in current. These transistors 70 and 71 are interconnected to form a multivibrator in addition to their function as an active current source. Due to the fact that the transistors themselves form the starting oscillator, the previously required components which couple the oscillator to the primary side of the transformer 74 only at the start and disconnect it from the transformer in the stationary state are no longer required.

A further advantage is the following: as shown, the frequency of the pulses controlling the primary side of the transformer 74, which short-circuits the primary winding of the transformer, is twice the operating frequency of the entire inverter. This cutting in half of the frequencies is inevitably accomplished by the multivibrator because the frequency of the multivibrator is known to equal one-half the frequency of the pulses controlling the multivibrator, i.e. the pulses switch the multivibrator from one state to the other. Due to the fact that the two transistors are combined into a multivibrator, it is also ensured that only one of the transistors can be conductive in a desired manner at any one time. It is then impossible that both transistors are conductive in an undesirable manner even temporarily.

The two transistors 70 and 71 operate as described in connection with FIG. 1. Beyond the described function they are additionally interconnected as a multivibrator by being equipped with capacitors 75 and 76, i.e. they form an astable circuit. The thus formed multivibrator then additionally acts as a starting oscillator which was formed by separate transistors in FIG. 1.

Immediately after the circuit is switched on, transistor 77, for example, is conductive and thus windings 72 and 73 are short-circuited. The starting oscillator formed by transistors 70 and 71 is now able to freely oscillate at its frequency determined by capacitors 75 and 76 and their associated resistors, e.g. at 50 kHz. Since the output voltage reaches transistors 71 and 72, the entire circuit is lo ensured to start oscillating in the manner accomplished by the separate oscillator in FIG. 1.

As soon as the circuit has started to oscillate, the control voltage at 78, which is derived, for example, by way of a pulse shaper 79 from the output voltage of the inverter at point 80, is transmitted via transistor 81, capacitor 82 and pulse shaper 83 in the same manner to the bases of transistors 70 and transistors 71. Now transistors 70 and 71 no longer act as a freely oscillating multivibrator but as switches which are separately controlled by the voltage at 78 for the above-described feeding of current into capacitors 75 and 76. A pulse from terminal UG flips the circuit including transistors 70 and 71 into the other one of the two states, i.e. transistor 70 is blocked, for example, and transistor 71 is controlled, to be conductive or vice versa. In this way it is ensured that transistors 70 and 71 always become conductive only successively and can never be conductive simultaneously. Due to the fact that control pulses from 78 travel to the bases of transistors 70 and 71 in the same manner via only one pulse shaper 83, the cost of the circuit is further reduced compared to the circuit according to FIG. 1 since in FIG. 1 two separate pulse shapers 84 and 85 are required, each including a control transistor, where necessary. This dual function performed by transistors 70 and 71 additionally eliminates the need for a circuit, as in FIG. 1, including two transistors 60 and 63 to switch on and switch off the starting oscillator from windings 25 and 2 of transformer 21.

It will be understood that the above description of the present invention is susceptible to various modifications, changes and adaptations, and the same are intended to be comprehended within the meaning and range of equivalents of the appended claims.

What is claimed is:

1. In an inverter for feeding a load having an inductive component with AC current pulses from a series connection of two power transistors energized by a pulsating DC power source, said two power transistors being alternatingly controlled to be conductive in a push-pull mode at a selected operating frequency greater than the pulsating frequency of the pulsating DC power source by first and second secondary windings of a current transformer, and wherein two free-running diodes are each disposed in parallel with a different one of said power transistors to be alternately conductive with its associated power transistor during portions of each AC cycle, and wherein a connecting point between said free-running diodes is connected to one terminal of a primary winding of said transformer and the other terminal of said primary winding is connected to a junction of said power transistors, the improvement comprising:

said secondary windings of said transformer are synchronously energized from an active switching current source to feed current pulses to switch said power transistors regardless of fluctuations in amplitude of the voltage of said pulsating DC power source, said connecting point between said free-running diodes being connected to a control terminal of said active switching current source which feeds a current pulse to one of said secondary windings of said transformer during one period of the operating frequency.

2. The inverter circuit of claim 1, wherein said secondary windings of said transformer control the current source as well as feed said current pulse thereto.

3. The inverter circuit of claim 1, wherein the duration of said current pulse is greater than the time during which the diode associated with each of said transistors is conductive.

4. The inverter circuit of claim 3, wherein said current pulse begins during the conductive phase of the diode connected in parallel with its associated transistor and ends after the start of the conductive phase of said transistor.

5. The inverter circuit of claim 2, wherein an end of one of said secondary windings is connected to the base of a third transistor whose collector is connected, via a pulse shaping circuit, with the base of a fourth transistor whose collector-emitter path is connected in series with a direct operating voltage and with the secondary winding.

6. The inverter circuit of claim 1, wherein said first and second secondary windings comprise a push-pull secondary winding which is grounded in the center and which has two ends, and further comprising two identical circuits each forming a controllable current source connected respectively to each of said two ends of said push-pull secondary winding.

7. The inverter circuit of claim 6, wherein said two ends of said push-pull secondary winding are connected together by an electronic switching element having a control electrode, wherein output voltage is applied to said control electrode by a pulse shaping network.

8. The inverter circuit of claim 1, further comprises freely oscillating oscillator means for starting oscillations which is coupled to one of said first and second secondary windings of said transformer.

9. The inverter circuit of claim 8, further comprising a rectifier for rectifying the alternating voltage present at one of said first and second secondary windings of said transformer to produce a direct voltage which, in stationary operation, interrupts the operation of said oscillator means.

10. The inverter circuit of claim 1, wherein said two power transistors are connected to said primary winding of said transformer, wherein said two power transistors are connected to act as a multivibrator which operates as a starting oscillator, and wherein the output of said starting oscillator starts up current oscillations in said secondary windings after turn-on.

11. The inverter circuit of claim 6, wherein said two ends of said push-pull secondary winding are connected together by an electronic switching element having a control electrode, and further comprising a control voltage source which produces an output voltage which oscillates at said selected operating frequency, wherein said output voltage is applied to said control electrode by said control voltage source at said selected operating frequency.

12. The inverter circuit of claim 8, further comprising a rectifier for rectifying the alternating voltage present at one of said first and second secondary windings of said transformer to produce a direct voltage which, in stationary operation, switches off said oscillator means.

* * * * *

UNITED STATES PATENT AND TRADEMARK OFFICE
CERTIFICATE OF CORRECTION

PATENT NO. : 4,847,746

DATED : July 11, 1989

INVENTOR(S) : Gerard Rilly et al

It is certified that error appears in the above-identified patent and that said Letters Patent is hereby corrected as shown below:

TITLE PAGE:
In the heading of the patent, under [73] the assignee's name should read --Thomson Electroménager S.A., Paris, France--.

Signed and Sealed this

Twenty-ninth Day of May, 1990

Attest:

HARRY F. MANBECK, JR.

*Attesting Officer*     *Commissioner of Patents and Trademarks*